Dec. 18, 1962 F. C. CALDWELL 3,068,630
APPARATUS FOR CUTTING AND WINDROWING
Filed July 14, 1960 3 Sheets-Sheet 1

INVENTOR
FREDERICK C. CALDWELL

BY *B. P. Fishburn, Jr.*

ATTORNEY

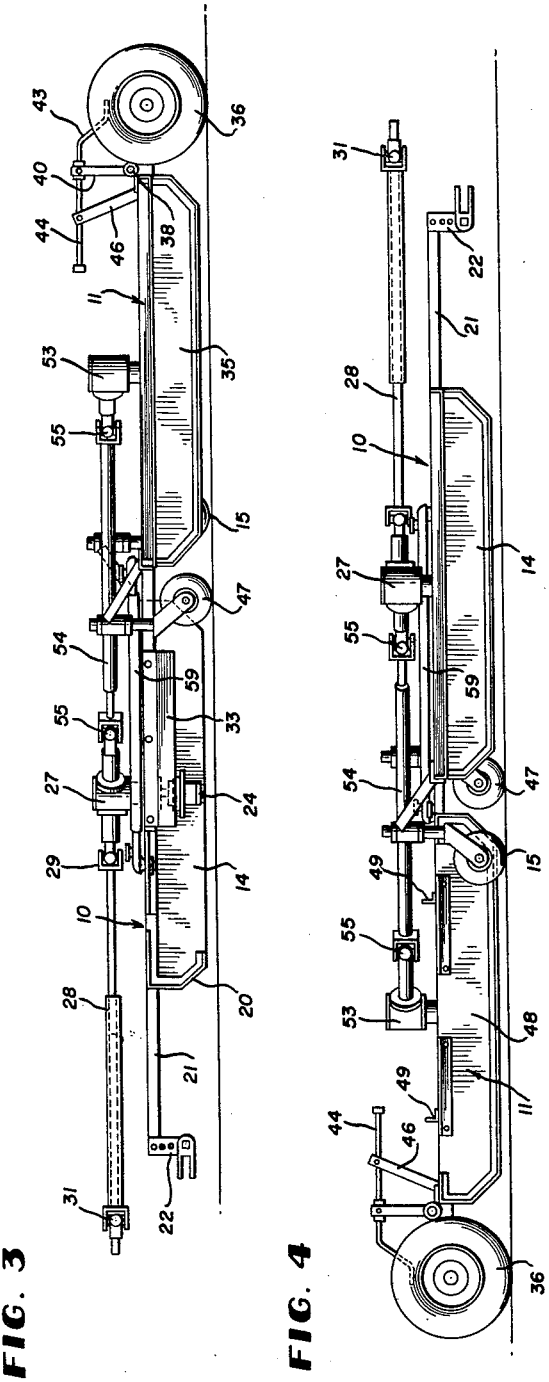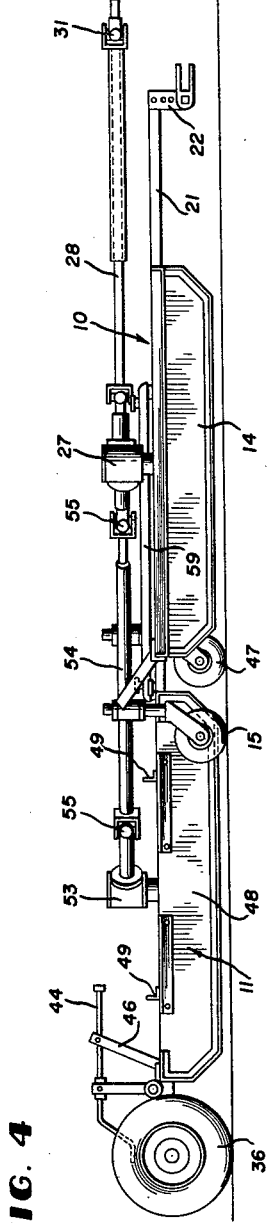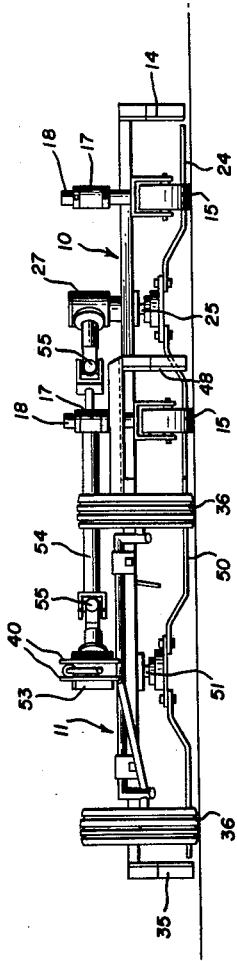

Dec. 18, 1962   F. C. CALDWELL   3,068,630
APPARATUS FOR CUTTING AND WINDROWING
Filed July 14, 1960   3 Sheets-Sheet 3
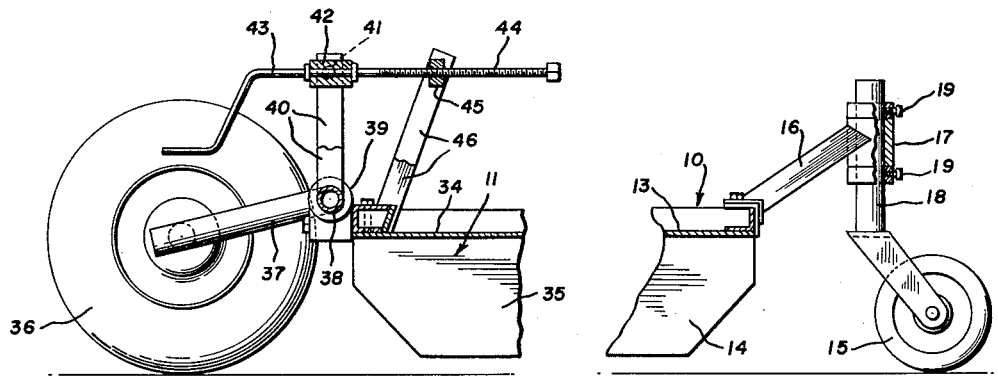
FIG. 6   FIG. 7
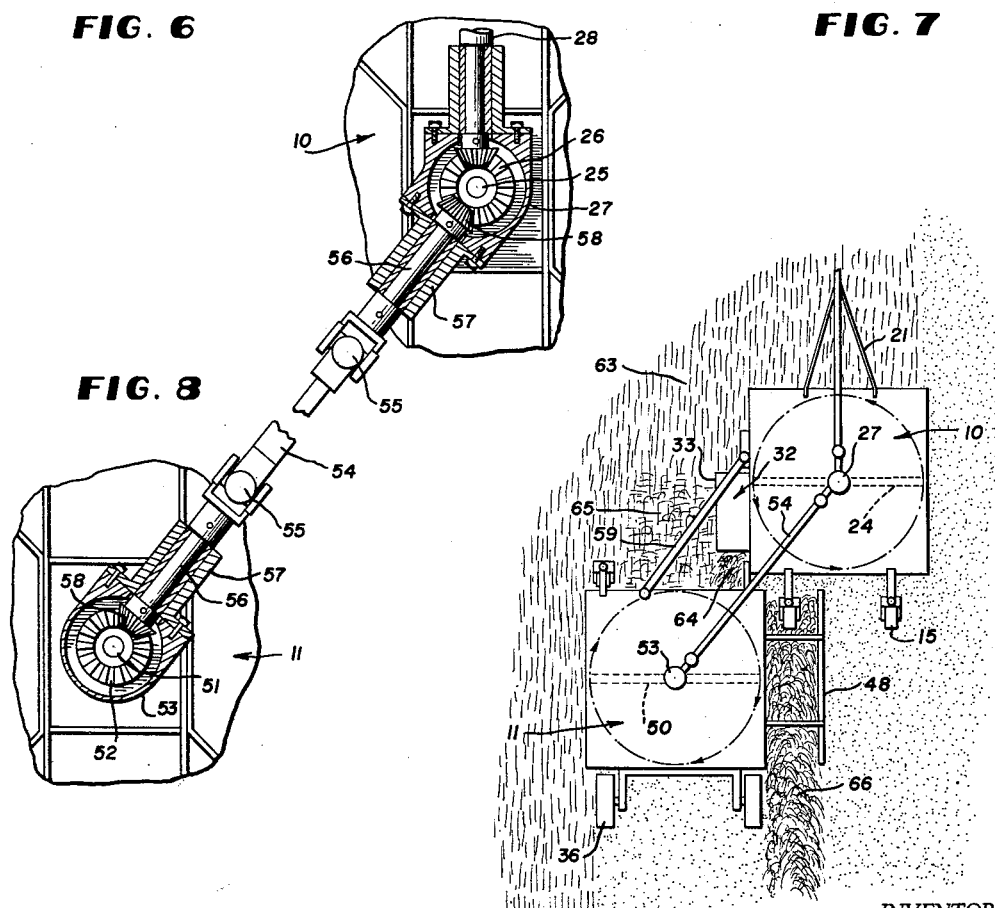
FIG. 8
FIG. 9
INVENTOR
FREDERICK C. CALDWELL
BY *B. P. Vishburn, Jr.*
ATTORNEY United States Patent Office 3,068,630
Patented Dec. 18, 1962

3,068,630
APPARATUS FOR CUTTING AND WINDROWING
Frederick C. Caldwell, Corpus Christi, Tex., assignor to
E. L. Caldwell & Sons, Inc., Corpus Christi, Tex., a
corporation of Texas
Filed July 14, 1960, Ser. No. 42,869
5 Claims. (Cl. 56—6)

This invention relates to a method of and apparatus for cutting and windrowing hay and like material.

An object of the invention is to provide a method and apparatus of the above-mentioned character in which a pair of mower units are coupled together in such a manner that a wide path may be cut through the standing grass or the like and the cuttings produced by each mower unit are deposited in a single uniform windrow.

Another object is to provide a method and apparatus for windrowing hay or the like embodying a pair of rotary type mowers having cutter blades which revolve in opposite directions and which are offset laterally with respect to each other so that the apparatus may process the widest possible path through the material to be cut and windrowed.

Another object of the invention is to provide a method of windrowing, wherein a first mower unit cuts a path through the material and deposits the cuttings in a first or temporary windrow in advance of a second mower unit and in the path of travel of the same; the second mower unit subsequently cutting a second path through the material adjacent the first windrow and depositing the cuttings from the second path and first windrow in a second or main windrow for subsequent harvesting.

Other objects and advantages of the invention will be apparent during the course of the following description.

Figure 1:
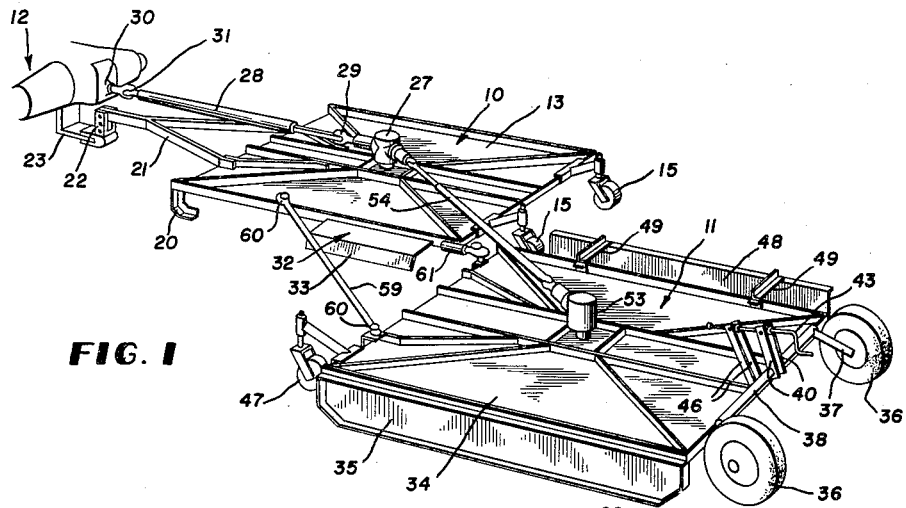
Figure 2:
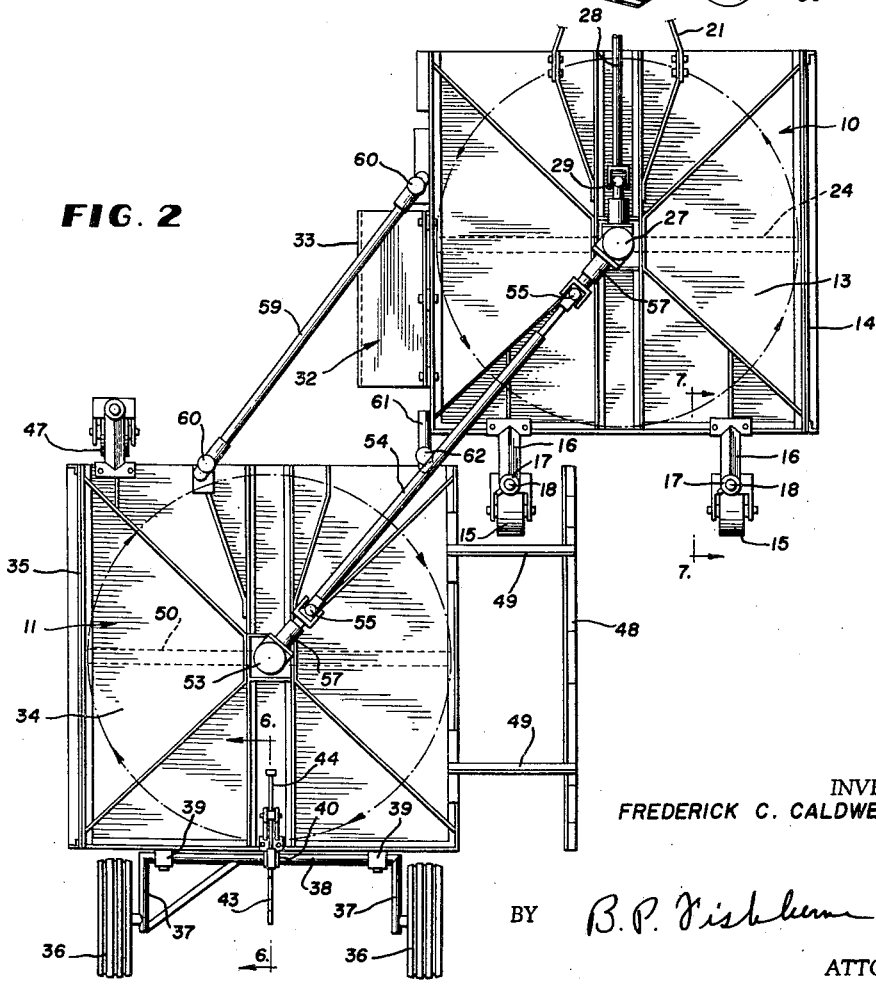

In the accompanying drawings forming a part of this application and in which like numerals are employed to designate like parts throughout the same:

FIGURE 1 is a perspective view of the apparatus employed in the practice of the method, FIGURE 2 is a plan view of the apparatus, FIGURE 3 is a side elevation of the apparatus viewed from the left hand side of FIGURE 2, FIGURE 4 is a side elevation of the apparatus viewed from the right hand side of FIGURE 2, FIGURE 5 is a rear elevation of the apparatus, FIGURE 6 is an enlarged fragmentary longitudinal vertical section taken on line 6—6 of FIGURE 2, FIGURE 7 is an enlarged fragmentary longitudinal vertical section taken on line 7—7 of FIGURE 2, FIGURE 8 is an enlarged fragmentary horizontal section through the interconnecting drive means of the two mower units, FIGURE 9 is a diagrammatic plan view of the apparatus illustrating the method of windrowing.

In the drawings, wherein for the purpose of illustration is shown a preferred embodiment of the invention, the numerals 10 and 11 designate separate mower units of the rotary cutter blade type in their entireties. The units 10 and 11 are similar in their overall construction although not identical, and the two units are coupled together in a manner to be described so as to constitute a unitary apparatus for cutting and windrowing hay or the like as the apparatus is drawn forwardly by a tractor 12.

The forwardmost mower unit 10 comprises a suitably braced top plate 13 and an outer depending vertical side wall 14, rigid therewith, and extending for the entire length thereof and having its lower edge spaced slightly above the ground in operation. The forward and rear ends of the mower unit 10 are open. A pair of vertically adjustable caster wheels 15 are secured to the rear end of the mower unit 10 through the medium of mounting brackets 16 having vertically disposed sleeves 17, receiving the standards 18 of the caster wheels 15, FIGURE 7. Set screws 19 are provided to facilitate vertical adjustment of the trailing caster wheels 15 of the first mower unit 10. A runner shoe 20 may be provided at the forward corner of the unit 10 remote from the side wall 14 to stabilize the first or forward unit 10.

The forward unit 10 is connected with the towing tractor 12 through the medium of a suitable tongue 21, connected at 22 with draw bar means 23 of the tractor 12.

The first mower unit 10 further comprises a rotary cutter blade 24, FIGURE 5, mounted for rotation with a vertical shaft 25, connected with and driven by bevel gearing 26, contained within a gear box 27, rigidly mounted upon the mower unit 10 centrally thereof, as shown. The rotary cutter blade 24 has its cutting portions disposed close to the ground and adjacent the lower edge of depending side wall 14. The bevel gearing 26 is operated by a drive shaft 28, connected therewith through a universal joint 29 and also connected with the power take off 30 of the tractor through another universal joint 31, FIGURE 1.

A first windrowing stop 32 having a depending stop portion or wall 33 is secured to the inner side of the mower unit 10, as shown in the drawings. The depending stop portion 33 is spaced outwardly a considerable distance from the adjacent longitudinal edge of the top plate 13 and extends longitudinally thereof for approximately one-half the length of the top plate 13 and from a point adjacent the gear box 27 to substantially the rear end of the top plate 13.

The second or rear mower unit 11 embodies a suitably braced top plate 34 and a rigid depending vertical outer side wall 35, similar to the previously mentioned side wall 14. The forward and rear ends of the mower unit 11 are open. The rear end of the mower unit 11 is provided with support wheels 36, mounted on arms 37, rigid with a transverse horizontal rock shaft 38, rotatable within bearings 39, rigidly secured to the rear end of the mower unit 11. Upstanding cranks 40 rigid with the rock shaft 38 near the transverse center of the mower unit 11 have their upper ends swiveled at 41 to a sleeve 42 within which is journaled an adjusting crank 43 having a forwardly extending screw-threaded shaft 44 engaging through a nut 45, rigid with upstanding bracket arms 46 having their lower ends rigidly secured to the top of mower unit 11 near the rear end of the same and at the transverse center thereof. By this means shown particularly in FIGURE 6, the rear wheels 36 are rendered vertically adjustable.

A caster wheel 47 similar to the previously described caster wheels 15 may be provided, if desired, at the forward corner of the unit 11 remote from the forward unit 10.

A second or main windrowing stop 48 is spaced a considerable distance from the inner side of the mower unit 11 and secured rigidly thereto by suitable arms 49. The stop 48 extends longitudinally of the unit 11 throughout its entire length, and the stop 48 is vertically disposed and has its lower edge disposed quite close to the ground during operation. The windrowing stop 48 may be shaped or formed substantially identical to the depending side wall 35. The previously described windrowing stop 32 of the forward mower unit 10 has its lower edge spaced a greater distance from the ground, for a purpose to be described. The windrowing stop 32 is disposed bodily forwardly of the rear mower unit 11 and in the path of travel of the same, FIGURE 2, while the windrowing stop 48 is disposed bodily rearwardly of the mower unit 10 in the path traversed by such mower unit and its cutter blade 24.

The rear mower unit 11 carries a rotary type cutter blade 50, similar to the cutter blade 24, and mounted for rotation with a vertical shaft 51, driven by bevel gearing 52, contained within a gear box 53, rigidly mounted atop the rear mower unit 11, centrally thereof. The cutter blade 50 is disposed at the same elevation as the cutter blade 24, see FIGURE 5.

A diagonal interconnecting drive shaft 54 extends between the two mower units 10 and 11 and has its ends connected with universal joints 55, and through these universal joints with short shafts 56, journaled within diagonal extensions 57 of the gear boxes 27 and 53. Bevel gears 58 on the short shafts 56 mesh with the gearing 26 and 52, FIGURE 8, so that the mower cutter blades 24 and 50 will always be driven in unison and in opposite directions, as indicated by the arrows in FIGURES 2 and 9. The cutter blade 24 revolves counter-clockwise toward the windrowing stop 32, and the cutter blade 50 revolves clockwise toward the windrowing stop 48. The interconnecting diagonal shaft 54 is preferably formed in telescoping sections so as to be extensible.

To further couple the mower units 10 and 11 and assure that the same will travel in unison in a straight line and in parallelism behind the tractor, there is provided a rigid diagonal link 59 extending between the inner side of the forward unit 10 and the front of the rear unit 11, as shown. Opposite ends of the link 59 are secured to the respective units 10 and 11 by ball and socket joints 60 or the like. A short coupling link 61 rigid with the inner rear corner of the mower unit 10 is also connected at 62 to the forward inner corner of the unit 11 by another ball and socket joint or equivalent.

With particular reference to diagrammatic FIGURE 9, the operation of the apparatus in the practice of the method is as follows.

The tractor 12 tows the apparatus forwardly in a straight line over the grass 63 or like material to be cut and windrowed. The cutter blades 24 and 50 of mower units 10 and 11 revolve in unison and in opposite directions as previously explained. The unit 11 trails the unit 10 as shown in FIGURES 2 and 9 and the two units are offset or staggered laterally so that a path through the material 63 equal in width to the combined diameters of the cutter blades 24 and 50 will be traversed and processed by the apparatus.

The cutter blade 24 of the forward unit 10 cuts the material 63 in a path equal in width to the diameter of the cutter blade 24, FIGURE 9, and this cut material is propelled laterally by the revolving blade 24 toward the depending stop element 33 of the forward unit 10. The short stop element 33 will serve to deposit some of the cuttings produced by the blade 24 in a first or temporary windrow 64, in advance of the rear unit 11. Some of the cuttings produced by the blade 64 will be slowed down by the windrowing stop 33 and deposited at 65 on the uncut material 63 in advance of the rear unit 11.

The rear unit 11 simultaneously cuts a path through the material 63 equal in width to the diameter of the blade 50 and in so doing, the cuttings produced by the blade 50 as well as the cuttings 65 and the windrowed material 64 are all acted upon by the blade 50 and propelled laterally toward the main windrowing stop 48, FIGURE 9, which stop deposits all of the cuttings produced by both units 10 and 11 in a single main windrow 66 as indicated in FIGURE 9.

Thus, the apparatus continuously cuts a very wide path through the material 63 and forms the preliminary or first windrow 64 and some scattered cuttings 65 in advance of the mower unit 11. The trailing mower unit 11 then cuts additional material 63 in its path of travel and also recuts and further processes the material 64 and 65 and finally deposits all of the cuttings produced by both units 10 and 11 in the single main windrow 66 for subsequent gathering. In the process, the first or temporary windrow 64 is entirely erased by the action of the cutter blade 50 and only the main windrow 66 remains behind the apparatus when the same completes its traverse of the field.

It is to be understood that the form of the invention herewith shown and described is to be taken as a preferred example of the same, and that various changes in the shape, size and arrangement of parts, as well as variations in the method steps, may be resorted to, without departing from the spirit of the invention or the scope of the subjoined claims.

Having thus described the invention, what is claimed is:

1. Apparatus for cutting standing vegetation in a wide path and depositing the cut vegetation in a single compact and uniform windrow without scattering, comprising a first wheeled vertical axis type rotary mower unit having a housing and including a substantially vertical windrowing stop extending longitudinally of the path of travel of said unit and spaced laterally of the rotary cutter of said unit, means to connect said first unit to a towing vehicle, a second vertical axis type rotary mower unit spaced rearwardly and offset laterally of the first unit in substantial diagonal spaced relationship therewith and being wheeled and having a housing, linkage means interconnecting said mower units enabling them to travel in unison along a common path in parallelism with said units collectively mowing the complete area of a wide path, gearing interconnecting the cutting elements of said units to cause the same to rotate in unison and in opposite directions, means connected with said gearing and adapted to be driven by power take-off means on said towing vehicle, and a second windrowing stop carried by said second unit and spaced laterally from the side thereof nearest the first unit and extending longitudinally thereof and disposed rearwardly of the first unit and spaced laterally of and substantially parallel to the windrowing stop of the first unit and rearwardly thereof, the windrowing stop of the first unit being on the side of the first unit nearest the second unit and in advance of the second unit.

2. Apparatus for mowing vegetation and depositing cuttings in a single compact windrow substantially without scattering and capable of traversing a wide path and completely mowing such path, said apparatus comprising a forward vertical axis horizontal rotary knife type mower unit adapted to be drawn by a towing vehicle, a rear mower unit of the aforementioned type arranged substantially diagonally of the forward unit and coupled thereto so that both units may travel in parallelism along said path, gearing means adapted to be powered from said towing vehicle and connected with the rotary knives of said units to rotate the same in unison and oppositely, a first windrowing stop on the side of the forward unit adjacent the rear unit and directly forwardly thereof and extending longitudinally of the path of movement of the apparatus and arresting cuttings produced by the first unit in advance of the second unit and depositing at least some of such cuttings in a temporary windrow in advance of the rear unit, and a second windrowing stop on the side of the rear unit which is adjacent the forward unit and disposed directly rearwardly of the forward unit and extending longitudinally of the path of movement of the apparatus and in substantially parallel laterally and longitudinally spaced relation to said first windrowing stop, whereby all of the cuttings produced by said forward and rear units are finally arrested by said second stop and deposited thereby in a final windrow.

3. Apparatus for cutting and windrowing comprising a forward mower unit adapted to be drawn by a tractor and having drive gearing for connection with a power take-off shaft of the tractor, a windrowing stop on one side of the forward mower unit to arrest cuttings thrown toward such side, a rear mower unit behind said forward unit and arranged substantially diagonally thereof in laterally offset relation thereto so that both units during forward movement may completely mow a wide path, additional gearing interconnecting the forward and rear mower units enabling them to operate in unison for mowing said path, mechanical coupling means for said units causing them to travel longitudinally substantially as one unit in parallelism and without appreciable relative lateral shifting or turning, one side of the rear unit being substantially in longitudinally alignment with the side of the forward unit carrying said stop, and another windrowing stop on said aligned side of the rear unit and spaced laterally thereof and disposed behind the forward unit and first-named stop and spaced laterally of the first-named stop.

4. The invention as defined by claim 3, and housings including top plates for the forward and rear units, and ground-engaging wheel means on said housings.

5. The invention as defined by claim 4, and wherein said windrowing stops are bodily mounted upon said housings.

References Cited in the file of this patent

UNITED STATES PATENTS

| | | |
|---|---|---|
| 2,240,168 | Adkisson | Apr. 29, 1941 |
| 2,592,270 | Getz | Apr. 8, 1952 |
| 2,682,142 | Clark | June 29, 1954 |
| 2,732,675 | Smith et al. | Jan. 31, 1956 |
| 2,743,567 | Martin | May 1, 1956 |
| 2,756,556 | Watkins | July 31, 1956 |
| 2,849,851 | Hayter | Sept. 2, 1958 |
| 2,952,961 | Engler | Sept. 20, 1960 |